Patented Dec. 14, 1948

2,456,318

UNITED STATES PATENT OFFICE 2,456,318

ESTERS OF P-DI(OMEGA-HYDROXY-ALKOXY)BENZENES

Edward O. Ramler, North Arlington, N. J., assignor to E. I. du Pont de Nemours & Company, Wilmington, Del., a corporation of Delaware No Drawing. Application May 29, 1946, Serial No. 673,156

4 Claims. (Cl. 260—83)

This invention relates to the preparation of new polymerizable compounds, the formation of polymers therefrom and, more particularly, to the formation of new hard, clear resins of low water absorption.

Heretofore there has not been available a satisfactory bi-functional monomer which will autopolymerize or copolymerize with other polymerizable compounds to yield a low water absorptive resin of high transparency and improved scratch resistance.

An object of the present invention is to prepare new polymerizable compounds and polymers and copolymers therefrom. A further object is to prepare new bi-functional compounds which will yield polymers and copolymers of extremely low water absorptive characteristics and excellent transparency and hardness and scratch resistance. Other objects will be apparent from the description of the invention given hereinafter.

The above objects are accomplished according to the present invention by esterifying both hydroxy groups of p-di(omega-hydroxyalkoxy)benzenes with an acid from the group consisting of acrylic and alkacrylic acids and substituted acrylic and alkacrylic acids, and polymerizing the resulting esters either alone or in admixture with other polymerizable compounds.

It has been found these esters of p-di(omega-hydroxyalkoxy)benzenes are readily polymerizable, either alone or with other polymerizable compounds, to give hard, transparent resins of exceptionally low water absorption. The p-di(omega-methacryloxyalkoxy)benzenes and, specifically, p-di(beta-methacryloxyethoxy)benzene, are especially preferred as yielding polymers and copolymers of outstanding properties. Monomeric p-di(beta-methacryloxyethoxy)benzene is believed to have the formula:

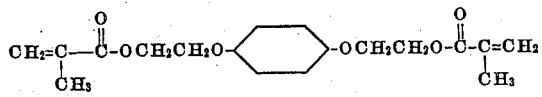

and is readily prepared by reacting methacrylic acid with p-di(beta-hydroxyethoxy)benzene which has the formula:

The following examples wherein the proportions are by weight unless otherwise specified, illustrate specific embodiments of this invention:

Example I 790 parts of absolute ethanol were placed in a three-necked flask equipped with a stirrer, calcium chloride drying tube, and reflux condenser. 220 parts of hydroquinone were added and dissolved in the ethanol. 96 parts (4 mols) of sodium were then added to the solution in small slices and the reaction mixture was allowed to stand for a period and then refluxed for one hour. At the end of the hour, 354 parts of ethylene chlorohydrin were added dropwise to the mixture without stirring and the mixture was then refluxed with stirring for a short time. Thereupon the mixture was filtered while hot to remove the sodium chloride formed and the filtrate, upon cooling, threw down a heavy precipitate which was filtered off. The precipitate was recrystallized from absolute methanol, yielding p-di(beta-hydroxyethoxy)benzene. This compound was further purified by standard procedure.

150 parts of the p-di(beta-hydroxyethoxy)benzene, 133 parts of methacrylic acid, 5 parts of hydroquinone, 5 parts of a powdered decolorizing carbon, and 6 parts of a powdered diatomaceous silica as an inert filter aid, were put into 440 parts of benzene mixed with 9.17 parts of concentrated sulfuric acid. This mixture was introduced into a three-necked flask equipped with a thermometer, cooling condenser and water receiver, and heated until approximately 80% of the theoretical water resulting from the esterification reaction was collected. The remaining reaction mixture was then filtered hot to remove the decolorizing carbon and powdered diatomaceous silica and the filtrate was allowed to stand over a two-day period at the end of which time a small amount of a crystalline product appeared on the bottom of the flask. The filtrate was then shaken with 10% sodium hydroxide and a large batch of crystals appeared. These crystals were filtered and dried, subsequently recrystallized in absolute ethanol, washed with water and again dried. The product obtained, p-di(beta-methacryloxyethoxy)benzene was in the form of white, odorless, flaky crystals melting at about 79° C.

Example II 100 parts of p-di(beta-methacryloxyethoxy)-benzene, as made in Example I, and 0.2 part of benzoyle peroxide were mixed in a beaker and heated at 100° C. In ten minutes the material had polymerized to yield a hard, clear resin of low water absorption.

Example III 20 parts of p-di(beta-methacryloxyethoxy)-benzene, as made in Example I, 80 parts of a monomeric methyl methacrylate, and 0.2 part of benzoyl peroxide were mixed together and the mixture was heated at 75° C. for 72 hours during which time it polymerized to a hard, transparent resin having a Rockwell hardness equal to 104 on the M scale and a yield temperature of 129° C.

The "yield temperature" above referred to is determined by immersing a molded specimen of the resin of the size 2.5 x 0.5 x 0.05 inches approximately one inch below the surface of a mineral oil bath (such as a heavy paraffin oil) and establishing the temperature at which the test piece sags 0.06 inch under a load of 27.5 grams applied with a two inch moment against the smallest dimension of the test piece.

*Example IV*

7.5 parts of p-di(beta-methacryloxyethoxy)-benzene, as made in Example I, and 7.5 parts of tetraethylene glycol dimethacrylate were mixed together and heated to 70° C. to yield a clear solution. To this solution was added 0.015 part of benzoyl peroxide which dissolved readily therein and the solution was then polymerized at a temperature of 70° C. in seven minutes to a hard, clear resin having a Rockwell hardness equal to 111 on the R scale and a water absorption of 1.17%. The water absorption of straight polymerized tetraethylene glycol dimethacrylate was 2.0%. The copolymer of this example, while actually not testing as hard as straight polymerized tetraethylene glycol dimethacrylate on the Rockwell scale, nevertheless exhibits considerably improved scratch resistance as compared to straight polymerized tetraethylene glycol dimethacrylate.

It will be understood that the above examples are merely illustrative and the present invention broadly comprises reacting p-di(omega-hydroxyalkoxy)benzenes with acrylic or alkacrylic acids or substitute acids to form esters and polymerizing the esters either alone or with other polymerizable compounds.

While the esters obtained by reacting p-di(beta-hydroxyethoxy)benzene with acrylic or alkacrylic acids are preferred in that they yield polymers of exceptional properties, the esters obtained by using other p-di(omega-hydroxyalkoxy)benzenes, such as p-di(omega-hydroxypropoxy)benzene and p-di(omega-hydroxybutoxy)benzene, readily prepared according to the procedure set forth in Example I, in place of p-di-(beta-hydroxyethoxy)benzene are also easily polymerized to give resins characterized by low water absorption and valuable as a component of copolymers having excellent scratch resistance. Other alkacrylic acids, as well as acrylic acid, may be substituted for the methacrylic acid in the process of Example I to yield the corresponding esters which are likewise polymerizable to low water absorptive resins. Such acids include acrylic acid, chloroacrylic acid, and other halide substituted acrylic and alkacrylic acids, ethacrylic acid and crotonic acid.

A particular advantage of these compounds is that they readily polymerize with other polymerizable compounds to give resins of high quality and notably low water absorption. These copolymers are, in general, harder than the straight polymer of the other component of the copolymer although in some instances this is not true on the basis of Rockwell hardness measurements. However, the particular property usually sought in resins of this type is scratch resistance and, in that property, the herein described compounds give copolymers of appreciable improvement over the straight polymer of the other component of the copolymer.

The benzene compounds of this invention may be copolymerized to advantage with other polymerizable compounds generally. Polymerizable vinyl compounds such as vinyl acetate, vinyl butyrate, and other vinyl esters, vinyl chloride and other vinyl halides, vinyl cyanide, and styrene, alkyl esters of acrylic acid such as methyl, ethyl, and butyl acrylates, and alkyl esters of alkacrylic acids including methacrylic and ethacrylic acid esters such as the methyl, ethyl, butyl, isobutyl, secondary butyl, and tertiary amyl esters, are all adapted to be copolymerized with these benzene compounds to give resins of low water absorption. Moreover, the acrylic and methacrylic acid esters of such polyhydric alcohols as disclosed in copending application Serial No. 671,393, filed May 21, 1946 in the names of A. W. Anderson and E. O. Ramler, where interpolymerized with the benzene compounds of this invention, as in Example IV, yield particularly useful compositions. The proportion of each component of the copolymer may be varied widely as will be appreciated by those skilled in the art.

Members of the class of p-di(omega-hydroxyalkoxy)benzenes have been synthesized heretofore, but the herein disclosed esters of these compounds are new. As disclosed, these bifunctional polymerizable esters are readily formed by reacting specific p-di(omega-hydroxyalkoxy)-benzenes with the desired acid, i. e., acrylic, methacrylic, ethacrylic acids, and the like.

Thus it will be seen an outstanding advantage of the present invention is that it provides a new class of readily prepared polymerizable compounds highly useful as components of copolymers characterized by two greatly desired properties, namely, scratch resistance and low water absorption. These benzene compounds also form useful polymers when polymerized in the absence of other polymerizable compounds.

As many apparently widely different embodiments of this invention may be made without departing from the spirit and scope thereof, it is to be understood that the invention is not limited to the specific embodiments thereof except as defined in the appended claims.

I claim:

1. As new compounds, p-di(beta-hydroxyethoxy)benzenes in which both hydroxy groups are esterified with an acid from the group consisting of acrylic acid, chloroacrylic, methacrylic, ethacrylic, and crotonic acids.

2. As a new compound, p-di(beta-methacryloxyethoxy)benzene.

3. A resin comprising a polymer of a p-di(beta-hydroxyethoxy)benzene in which both hydroxy groups are esterified with an acid from the group consisting of acrylic acid, chloroacrylic, methacrylic, ethacrylic, and crotonic acids.

4. A resin comprising a polymer of p-di(beta-methacryloxyethoxy)benzene.

EDWARD O. RAMLER.

REFERENCES CITED

The following references are of record in the file of this patent:

UNITED STATES PATENTS

| Number | Name | Date |
|---|---|---|
| 2,338,683 | Coleman | Jan. 4, 1944 |